3,113,942
MONO-ALKYL ETHERS OF TRIS(2-HYDROXY-PHENYL)TRIAZINES
Iral B. Johns, Marblehead, and Harry R. Di Pietro, Watertown, Mass., assignors to Monsanto Research Corporation, St. Louis, Mo., a corporation of Delaware
No Drawing. Filed July 13, 1961, Ser. No. 123,663
2 Claims. (Cl. 260—248)

This invention relates to nitrogenous ethers and more particularly to ethers of hydroxy-aryl-substituted triazines and to methods of preparing the same.

According to the invention, there are provided new and valuable aliphatic mono-ethers by reaction of a 2,4,6-tris(2-hydroxyaryl)-s-triazine or an alkali metal salt thereof with a dialkyl sulfate, the reaction proceeding as follows:

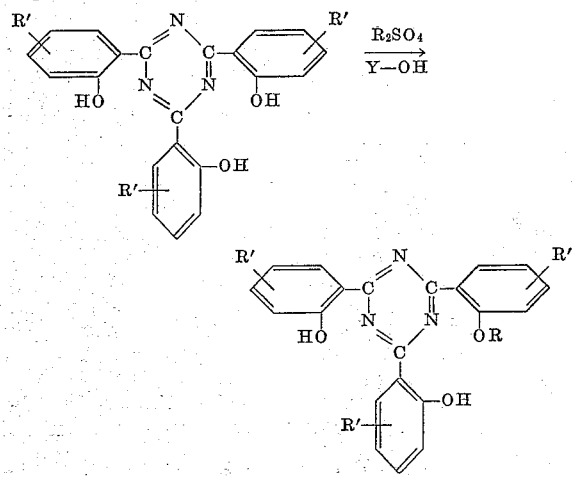

R' is selected from the class consisting of hydrogen and alkyl radicals of from 1 to 5 carbon atoms, R is an alkyl radical of from 1 to 5 carbon atoms, and Y is alkali metal.

The tris(2-hydroxyaryl)-s-triazines which are employed as starting materials are readily obtainable by the trimerization of nitrile or amide of an o-hydroxy-substituted aromatic monocarboxylic acid. For example, as described by Cousin and Volmar, Bull. Soc. Chim. (4), 15, 416 (1914), upon heating salicylamide at 260–270° C., 2,4,6 - tris(2 - hydroxyphenyl)-s-triazine is obtained. The alkyl-substituted salicylamides are similarly converted to the 2,4,6-tris(alkyl-2-hydroxyphenyl)-s-triazines, e.g., trimerization of 2,3-, 2,4-, 2,5-, or 2,6-cresotamide yields 2,4,6-tris(3- or 4- or 5- or 6-methyl-2-hydroxyphenyl)-s-triazine and similarly the trimerization of 3-, 4-, 5-, or 6-ethylsalicylamide yields 2,4,6-tris(3-, 4-, 5-, or 6-ethyl-2-hydroxyphenyl)-s-triazine.

The dialkyl sulfates which are employed for the etherification of the 2,4,6-tris(2-hydroxyaryl)-s-triazine have from 1 to 5 carbon atoms in each alkyl radical, e.g., there may be employed dimethyl, diethyl, diisopropyl, di-n-propyl, di-n-butyl, di-tert-butyl, di-n-pentyl, or diisopentyl sulfate.

Examples of the mono-alkyl ethers provided by the invention are 2,4-bis(2 - hydroxy - 4-methylphenyl)-6-(2-methoxy-4-methylphenyl)-s-triazine which is obtained by reaction of 1 mole of dimethyl sulfate with 1 mole of 2,4,6-tris(2 - hydroxy - 4 - methylphenyl)-s-triazine; 2,4-bis(2-hydroxyphenyl) - 6 - (2-propoxyphenyl)-s-triazine by reaction of 1 mole of dipropyl sulfate with 1 mole of 2,4,6-tris(2 - hydroxyphenyl) - s - triazine; 2,4-bis(2-hydroxyphenyl)-6-(2-pentyloxyphenyl)-s-triazine by reaction of 1 mole of dipentyl sulfate with 1 mole of 2,4,6-tris(2-hydroxyphenyl)-s-trazine; 2,4 - bis(3 - isopropyl-2-hydroxyphenyl) - 6 - (3 - isopropyl - 2 - ethoxyphenyl)-s-triazine from 1 mole of diethyl sulfate and 1 mole of 2,4,6-tris(3-isopropyl - 2 - hydroxyphenyl) - s - triazine; 2,4 - bis(2 - hydroxyphenyl) - 6 - (2 - ethoxyphenyl)-s-triazine from 1 mole of diethyl sulfate and 1 mole of 2,4,6-tris(2-hydroxyphenyl)-s-triazine; 2,4-bis(2-hydroxy-3-ethylphenyl)-6-(2-methoxy-3-ethylphenyl) - s - triazine from 1 mole of dimethyl sulfate and 1 mole of 2,4,6-tris(2-hydroxy - 3 - ethylphenyl)-s-triazine; 2,4-bis(2-hydroxy - 4 - butylphenyl) - 6 - (tert - pentyloxy-4-butylphenyl)-s-triazine from 1 mole of tert-pentyl sulfate and 1 mole of 2,4,6-(2-hydroxy-4-butylphenyl)-s-triazine; 2,4-bis(2-hydroxy - 3 - pentylphenyl) - 6 - (2-methoxy-3-pentylphenyl)-s-triazine from 1 mole of dimethyl sulfate and 1 mole of 2,4,6-(2-hydroxy-3-pentylphenyl)-s-triazine, etc.

Reaction of the 2,4,6-(2-hydroxyaryl)-s-triazine with the dialkyl sulfate takes place readily at ordinary, decreased, or moderately increased temperatures in an alkaline medium, advantageously, in the presence of alkali metal hydroxide, i.e., sodium, potassium, lithium, rubidium, or cesium hydroxide and an inert diluent or solvent. Generally, the reaction is mildly exothermic, so that in order to effect smooth reaction, cooling is advantageously employed initially, with completion of the reaction being conducted at the exothermal temperature or by application of moderate external heating. The temperature conditions will vary somewhat with the nature of the triazine starting material and with the dialkyl sulfate, since substitution in the aryl group of the triazine generally increases activity and increase in the carbon chain of the dialkyl sulfate tends to decrease activity. Generally, however, the variation in temperature conditions will be found to be unsubstantial, and the temperature to be used for obtaining optimum conversion to the mono-alkyl ether will be readily arrived at, by one skilled in the art, for each pair of reactants.

Instead of employing the free hydroxy triazines and working in alkaline medium, the hydroxy triazines may first be converted to the alkali metal salts thereof, e.g., by heating the hydroxy compound with alkali metal or alkali metal hydroxide in the substantial absence of water, and then contacting the resulting alkali metal phenylate with the dialkyl sulfate. For preparation of good yields of the mono-ethers, rather than of di- and tri-ethers or mixtures of the same, it is preferred to react the hydroxy triazines with the dialkyl sulfates in the aqueous alkaline medium.

Since formation of the mono-ether proceeds by reaction of one mole of the dialkyl sulfate with one of the hydroxy radicals of the tris(hydroxyaryl-s-triazine, the two reactants are advantageously employed in such stoichiometric proportions, although an excess of either reactant may be used. Generally in order to obtain the mono-ethers, there should be employed, of course, one mole or less of the sulfate to the triazine; however, the use of a substantial excess of the sulfate over this ratio also results in some mono-ether. Even in a 3:1 molar ratio of sulfate to the hydroxy triazine, there will be present in the reaction mixture minor amounts of mono-etherification product together with other products, particularly if the reaction is interrupted before all of the sulfate component has had opportunity to participate. The extent and completion of the reaction can be ascertained by noting the cessation of change in the refractive index and/or in the temperature of the reaction mixture or by sampling the reaction mixture for alkoxy content. To obtain a preponderance of the mono-etherification product, it is advisable to mitigate reaction rate, e.g., by employing a large quantity of diluent and/or by operating at the lower temperatures. The presence of a large quantity of inert diluent or solvent is advantageous also in avoiding side-reactions, e.g., polymerization. Inert liquid diluents which are useful for the present purpose are polar solvents, generally, e.g., methanol, ethanol, isopropanol, dioxane, morpholine, pyridine, dimethylformamide, dimethylsulfoxide, the lower alkyl ethers of ethylene glycol or diethylene glycol, etc., as well as the non-polar liquids such as benzene, hexane, dichlorobenzene or carbon tetrachloride, which materials while not being solvents for the tris(hydroxyaryl)-s-triazines are useful in serving to facilitate uniform distribution of the reactants through the reaction mixture.

The reaction results in the production of alkali metal alkyl sulfate as by-product. This may be readily removed from the reaction product by washing with water or ether and/or by filtration. Any unreacted sulfate or triazine as well as the diluent, may be removed by distillation, or the desired ether product may be obtained from the reaction mixture by solvent-extraction, fractional crystallization, etc.

The presently provided alkyl mono-ethers of the 2,4,6-tris(2-hydroxyphenyl)-s-triazines are stable, well-characterized compounds which are generally waxy to crystalline solids. They are advantageously employed for a variety of industrial and agricultural purposes, e.g., as bactericides and fungicides, as antioxidants and curing aids in the manufacture of natural and synthetic rubber products, as comonomers in the manufacture of linear polyesters by reaction with dicarboxylic acid compounds, etc. As disclosed in our copending application, Serial No. 123,637, filed on even date, the presently provided ethers are valuable as starting materials for the synthesis of polymeric coordination compounds with bivalent tetracoordinate metals, particularly beryllium, nickel, lead, zinc and copper, which coordination compounds are highly heat-resistant, moldable, and extrudable solids of good mechanical strength.

The invention is further illustrated by, but not limited to, the following examples.

*Example 1*

To a cold (5° C.) solution consisting of 10 g. of tris-(2-hydroxyphenyl)-s-triazine and 48 g. of sodium hydroxide in 120 ml. of water and 150 ml. of ethanol there was added, dropwise, 35 cc. of dimethyl sulfate. As the last 10 cc. of the sulfate was added, the reaction became exothermic. When all of the sulfate had been added, cooling was discontinued and the reaction was allowed to proceed to complete solution. After standing for about 30 minutes, the reaction mixture was treated with about 1 liter of water, whereupon flocculent precipitation occurred. The solid was filtered off, washed with ether and dried to give the substantially pure 2,4-bis(2-hydroxyphenyl)-6-(2-methoxyphenyl)-s-triazine, M.P. 166–167° C., and analyzing as follows:

| | Found | Calcd. for $C_{22}H_{17}N_3O_3$ |
|---|---|---|
| Percent C | 71.2 | 71.15 |
| Percent H | 4.5 | 4.62 |
| Percent N | 11.3 | 11.32 |
| Percent—$OCH_3$ | 8.0 | 8.35 |

*Example 2*

The 2,4-bis(2-hydroxyphenyl)-6-(2-methoxyphenyl)-s-triazine of Example 1 was converted to its copper chelate as follows: Said triazine compound (0.5 g.) was warmed in 70 ml. of dioxane to complete solution, and the solution was allowed to cool to room temperature. To the solution there was then added 250 mg. of cupric acetate monohydrate dissolved in 30 ml. of ethanol. The green, flocculent precipitate which resulted was separated in the centrifuge, washed with absolute ethanol, filtered and dried in vacuo at 60° C. for one hour to give a quantitative yield of polymeric copper chelate which analyzed as follows:

| | Found | Calcd. for $C_{22}H_{15}N_3O_3Cu$ |
|---|---|---|
| Percent Cu | 14.53 | 14.68 |
| Percent—$OCH_3$ | 8.2 | 8.35 |

The polymeric chelate thus had an average of one copper atom and one methoxy radical per triazine unit. It was insoluble in water and in most organic solvents and not affected by heat at temperature of up to 360° C. It was molded under high pressure to give highly heat-resistant, translucent molded pieces of good mechanical strength and dimensional stability.

What we claim is:

1. 2,4-bis(2-hydroxyphenyl)-6-(2-alkoxyphenyl)-s-triazine wherein the alkoxy has from 1 to 5 carbon atoms.

2. 2,4-bis(2-hydroxyphenyl)-6-(2-methoxyphenyl-s-triazine.

References Cited in the file of this patent
UNITED STATES PATENTS

| 1,549,901 | Bonhote | Aug. 18, 1925 |
| 1,566,742 | Fritzsche et al. | Dec. 22, 1925 |

OTHER REFERENCES

Noller: "Chemistry of Organic Compounds," W. B. Saunders Co., 1957, Second Edition, pages 137 and 504.

Smolin et al.: S-Triazines and Derivatives, Interscience Publishers Inc., N.Y., 1959, pages 172–176.